(12) United States Patent
Getgood

(10) Patent No.: US 7,837,164 B1
(45) Date of Patent: Nov. 23, 2010

(54) TARPAULIN CLAMPING ASSEMBLY AND ASSOCIATED METHOD

(76) Inventor: David Getgood, 1722 Redwood Cir., Alvin, TX (US) 77511

( * ) Notice: Subject to any disclaimer, the term of this patent is extended or adjusted under 35 U.S.C. 154(b) by 339 days.

(21) Appl. No.: 12/001,278

(22) Filed: Dec. 11, 2007

(51) Int. Cl.
*A47B 96/00* (2006.01)
(52) U.S. Cl. .............................. 248/222.14; 248/220.21; 248/223.41; 248/224.8; 135/120.3
(58) Field of Classification Search ............ 248/220.21, 248/222.14, 223.41, 224.61, 224.7, 224.8; 135/119, 120.3; 38/102.1, 102.91
See application file for complete search history.

(56) References Cited

U.S. PATENT DOCUMENTS

| | | | |
|---|---|---|---|
| 3,656,212 A * | 4/1972 | Velte | .......................... 24/493 |
| 5,031,956 A | 7/1991 | Hudgins | |
| 5,415,915 A | 5/1995 | Oh | |
| 5,424,107 A | 6/1995 | Lee | |
| 5,529,083 A | 6/1996 | Martin | |
| 5,540,475 A | 7/1996 | Kersting et al. | |
| 5,563,766 A * | 10/1996 | Long et al. | ................... 361/600 |
| 5,922,432 A | 7/1999 | Kalal | |
| 5,984,379 A | 11/1999 | Michel et al. | |
| 6,047,441 A | 4/2000 | Moorman | |
| 6,193,299 B1 | 2/2001 | Than | |
| 2003/0208934 A1 * | 11/2003 | Ocampo | ........................ 38/12 |

* cited by examiner

*Primary Examiner*—Terrell Mckinnon
*Assistant Examiner*—Bradley H Duckworth
(74) *Attorney, Agent, or Firm*—Montgomery Patent and Design; Robert C. Montgomery

(57) ABSTRACT

A two-piece clamping system for creating a reinforced attachment point for tarpaulins or the like includes a "Y"-shaped bottom clamp with retaining slots on its bifurcated end, a securing groove within its body, and an extending tab with a grommet to receive a carabiner or hook for attaching the clamp to a support structure. An upper clamp portion includes two legs for retaining the tarpaulin within the slots on the bottom clamp. A mechanical fastener such as a screw and wing nut secure the tarpaulin's grommet within both halves of the clamping system thereby providing a quick and easy method for attaching a reinforcing clamping system to tarpaulins.

10 Claims, 5 Drawing Sheets

TARPAULIN CLAMPING ASSEMBLY AND ASSOCIATED METHOD

RELATED APPLICATIONS

The present invention was first described in Disclosure Document No. 579,763 filed on Jun. 9, 2005.

FIELD OF THE INVENTION

This invention relates to clamping assemblies and, more particularly, to a two-piece tarpaulin clamping assembly for securely fastening a tarpaulin to a support surface.

BACKGROUND OF THE INVENTION

Tarpaulins, otherwise known as tarps, are commonly used to cover items and material located outdoors thus affording such objects protection from the environment. The list of objects covered by tarpaulins includes topsoil, mulch, firewood, building materials, outdoor furniture and the like. They are also used to make temporary enclosures such as dining flies or even tents while camping. However, one thing all of the above duties have in common is that the tarpaulin is typically tied down on the corners. This action places a great deal of stress on the corner, particularly on the grommet itself. Should winds develop, or heavy rains occur, the stress placed on the corner connection is often high enough to rip out the grommet and destroy the tarp. Accordingly, there is a need for a means by which tarpaulins can be afforded a method of corner attachment that is stronger and more secure than the conventional grommets usually supplied.

Several attempts have been made in the past to develop a two-piece tarpaulin clamping assembly employing a carabiner for securely fastening the tarpaulin to a support surface. U.S. Pat. No. 5,984,379 in the name of Michel, et al discloses an apparatus for retaining a side edge of a tarpaulin along a side portion of an open-topped box such as a truck box, wherein the tarpaulin includes a rigid rod connected along its side edge. The apparatus includes a bracket for attachment to the side of the box. A clamp arm is pivotally mounted to the bracket for movement about a pivot axis between a closed clamping position for securing the rod and tarpaulin side edge in fixed relation to the clamp arm and side portion of the box and an open position for releasing the rod and tarpaulin side edge. A clamp arm latch is pivotally mounted so that it can be manually shifted between a latched position wherein the clamp arm is secured in the closed position and an unlatched position wherein the clamp arm is free to pivot to the open position. Unfortunately, this prior art example does not provide a means of reinforcing a torn or ripped portion of an edge of an existing tarpaulin, and allowing the edge to still be secured to a surface as intended.

U.S. Pat. No. 5,922,432 in the name of Kalal discloses a corner reinforcement for tarpaulins that has an upper and lower plate connected by two enclosed edges forming a right angle. The reinforcement structure has an open edge that arcs back towards the corner defined by the enclosed edges and has rivet holes fixed along an arc concentric thereto. A rib positioned on the inside surface of the top plate runs along the arc defined by the rivet holes on the upper plate, while a mateable groove positioned on the inside surface of the bottom plate runs along the arc defined by the rivet holes on the bottom plate. A grommet is also provided for securing a rope to the corner of the tarpaulin. The corner of a tarpaulin is inserted through the open edge and its shape is accommodated by the right angle formed by the enclosed edges. The rivets are then fixed in place causing the rib and groove to mate, providing reinforcement to the corner. Unfortunately, this prior art example only provides a reinforcement means for a corner area of an existing tarpaulin.

U.S. Pat. No. 5,424,107 in the name of Lee describes a reinforced corner structure for cloth, especially a tent, capable of enabling the cloth corner to endure the dragging force coming from a cord installed therein and tied at a support and thus prolonging the life of the cloth. This reinforced corner structure comprises upper and lower plates for covering the upper and lower surfaces of the corner and reinforcing this corner. These upper and lower plates are integrally formed by a single injection molding of plastic material and each of them is an equilateral trapezoid in figure. This trapezoidal structure is opened at two sides but closed at the two other sides thereof, thereby allowing a cloth corner to be adjusted therein and preventing the corner of cloth from jutting out of the structure after the corner structure is fixed to the corner of cloth. Unfortunately, this prior art example does not allow for reinforcement of an area other than a corner of a material, and does not include a carabiner mechanism for securely fastening the material to a surface.

U.S. Pat. No. 5,415,915 in the name of Oh discloses a corner reinforcement for cloth. This reinforcement comprises upper and lower plates for covering the upper and lower surfaces of the corner and reinforcing this corner. These upper and lower plates are integrally formed with each other in a single injection molding and have the same right-angled triangular appearance so as to provide a twofold right-angled triangular structure. This triangular structure of the reinforcement is opened at its hypotenuse but closed at the remaining sides thereof, thereby preventing the corner of cloth from jutting out of the reinforcement after fastening the reinforcement to the corner of cloth. The upper and lower plates each has an opening for a pitching rope and they are integrally formed with annular protrusions or eyelets which are adapted to reinforce the upper and lower plates against pull of the rope tied thereto. The reinforcement further includes grooves and protrusions to clamp the corner of cloth. These grooves and protrusions are provided at inner surfaces of the upper and lower plates. Unfortunately, this prior art example also does not provide a means of reinforcing a torn area of an existing cloth, and is a one piece apparatus that may not accommodate certain thicknesses of material needing to be reinforced.

None of the prior art particularly describes to a two-piece tarpaulin clamping assembly employing a carabiner for securely fastening the tarpaulin to a support surface. Accordingly, there is a need for an assembly which provides such features while overcoming the above noted shortcomings.

SUMMARY OF THE INVENTION

In view of the foregoing disadvantages inherent in the prior art, it has been observed that there is need for a two-piece tarpaulin clamping assembly employing a carabiner for securely fastening the tarpaulin to a support surface.

The assembly includes a lower clamp that has a first aperture formed therein and includes a non-linear groove formed within a top surface thereof. Of course, such an aperture and groove can be formed in a variety of shapes and sizes, as is obvious to a person of ordinary skill in the art. Such a lower clamp includes a bifurcated distal end. Such a groove has a general "U"-shape that effectively extends into the bifurcated distal end. The lower clamp further includes a plurality of retaining slots formed therein and oriented perpendicular to a longitudinal length of the lower clamp. Each of such retaining slots has a rectilinear shape and is spaced distally from the groove. Of course, such retaining slots can be formed in a variety of shapes and sizes, as is obvious to a person of ordinary skill in the art. The lower clamp has a "Y"-shape defining an extended end provided with a second aperture.

The assembly further includes an upper clamp including a non-linear ridge projecting downwardly from a bottom surface thereof. Such a ridge is advantageously interfitted and mated with the groove when the upper and lower clamps are engaged. The upper clamp is conveniently provided with an extended tab monolithically formed with a proximal end thereof. Such a tab is provided with a hole formed therein, which is critical such, that the hole is aligned with the first aperture when the upper and lower clamps are engaged. The upper clamp further includes a plurality of opposed retaining legs extending outwardly from a centrally registered longitudinal axis of the upper clamp. Each of such retaining legs tapers laterally and distally, which is vital such that the retaining legs advantageously fit within the retaining slots when the upper clamp is positioned on top of the lower clamp. The selected portion of the tarpaulin is simultaneously lodged within the retaining slots while the retaining legs are fitted therein.

The assembly further includes a first fastener removably inserted through the first aperture and the hole respectively. A selected portion of the tarpaulin is intercalated between the ridge and the groove, which is crucial such that the first fastener effectively pushes the selected portion of the tarpaulin through the retaining slots. The assembly further includes a second fastener removably inserted through the second aperture. Of course, such a first and second fastener can be produced in a variety of shapes and sizes, as is obvious to a person of ordinary skill in the art.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

DESCRIPTIVE KEY

| 10 | secure clamping system |
|----|------------------------|
| 11 | extension end |
| 12 | clamp grommet |
| 13 | lower clamp |
| 14 | groove |
| 15 | retaining slot |
| 16 | bifurcated end |
| 17 | side wall |
| 20 | upper clamp |
| 21 | screw |
| 22 | nut |
| 23 | bolt hole |
| 24 | ridge |
| 25 | retaining leg |
| 30 | tarpaulin |

DETAILED DESCRIPTION OF THE PREFERRED EMBODIMENT

The best mode for carrying out the invention is presented in terms of its preferred embodiment, herein depicted within FIGS. 1 through 8. However, the invention is not limited to the described embodiment and a person skilled in the art will appreciate that many other embodiments of the invention are possible without deviating from the basic concept of the invention, and that any such work around will also fall under scope of this invention. It is envisioned that other styles and configurations of the present invention can be easily incorporated into the teachings of the present invention, and only one particular configuration shall be shown and described for purposes of clarity and disclosure and not by way of limitation of scope.

The terms "a" and "an" herein do not denote a limitation of quantity, but rather denote the presence of at least one of the referenced items.

Figure 1:
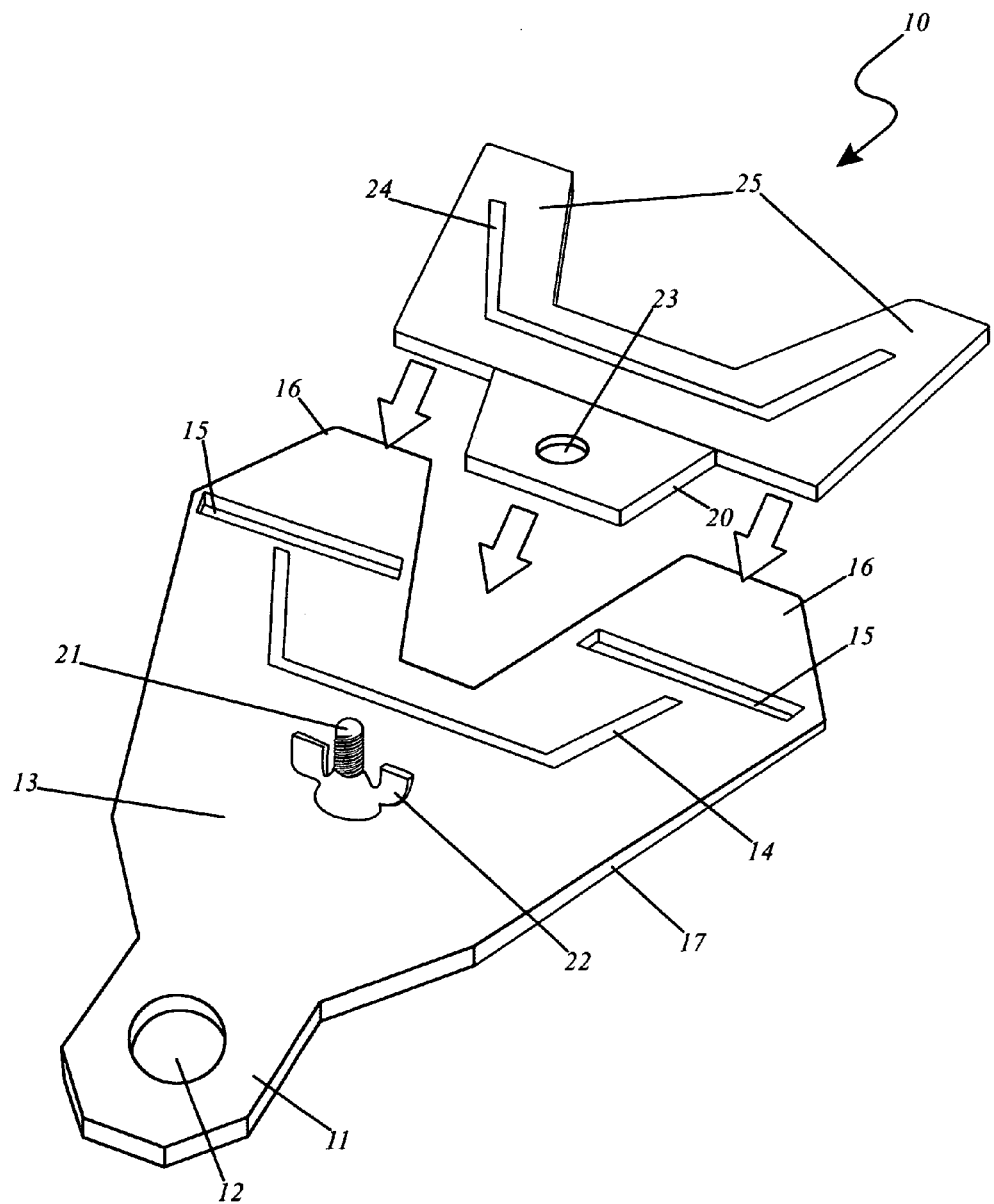
FIG. 1 is a perspective view of the secure clamping system 10, according to a preferred embodiment of the present invention.
Figure 2:
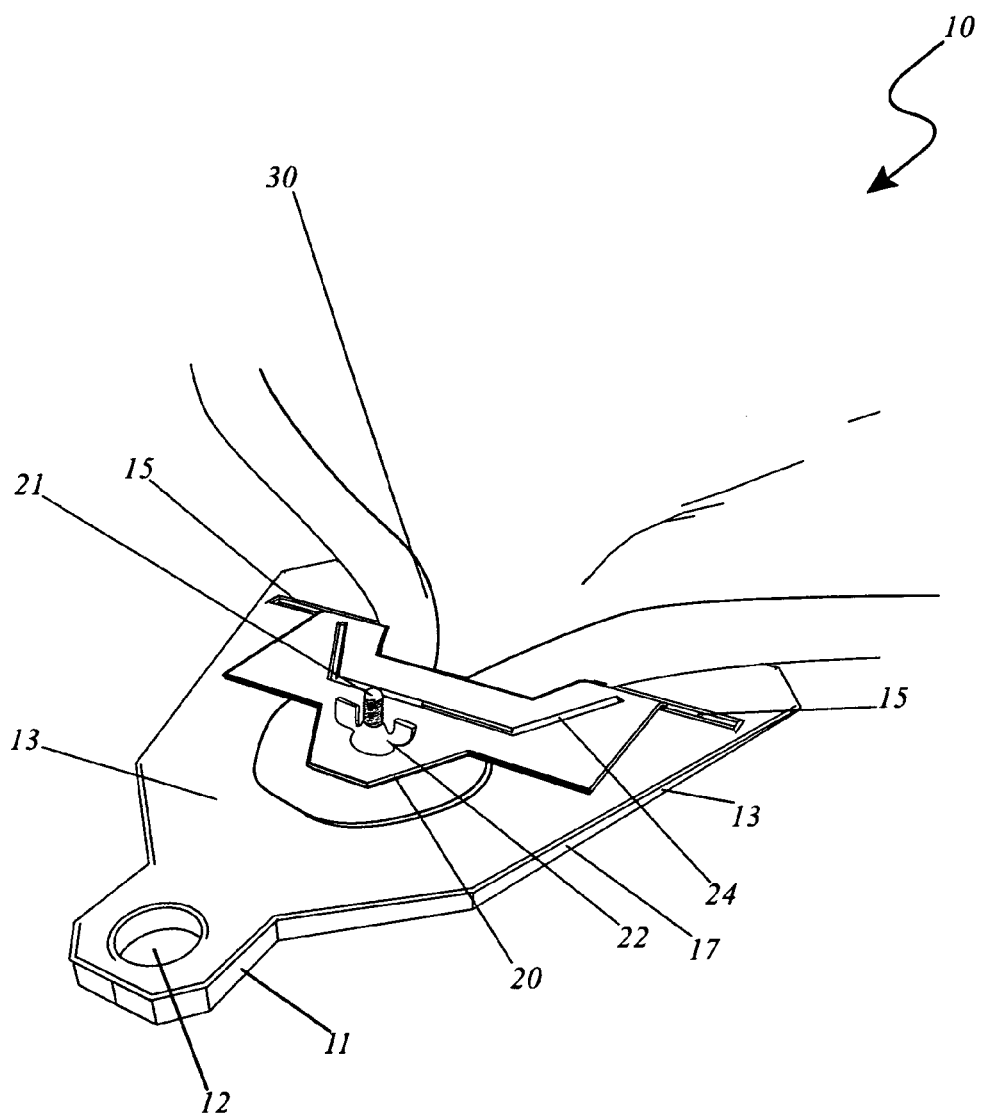
FIG. 2 is a perspective view of the secure clamping system 10 of FIG. 1, attached to and securing a tarpaulin 30, according to a preferred embodiment of the present invention.

Referring now to FIG. 1 and FIG. 2, the secure clamping system 10, essentially comprises a two-piece upper 20 and lower 13 clamp mechanism for reinforcing the corners of or creating an independent attachment point for tarpaulins 30 or similar devices and may be manufactured out of a heavy-duty and resilient material such as galvanized or stainless steel or a molded plastic. As is seen in FIG. 2, the secure clamping system 10 retains a tarpaulin corner 30, or other attachment point, between a removable upper clamp 20 and a resilient lower clamp 13.

Figure 3:
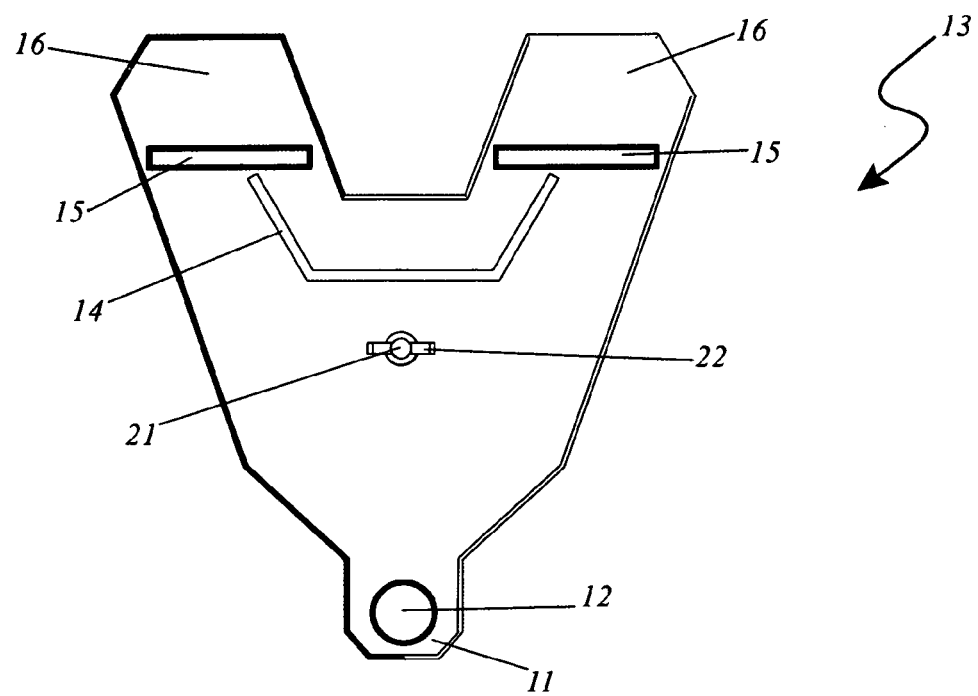
FIG. 3 is a top plan view of the lower clamp 13, according to a preferred embodiment of the present invention.
Figure 4:
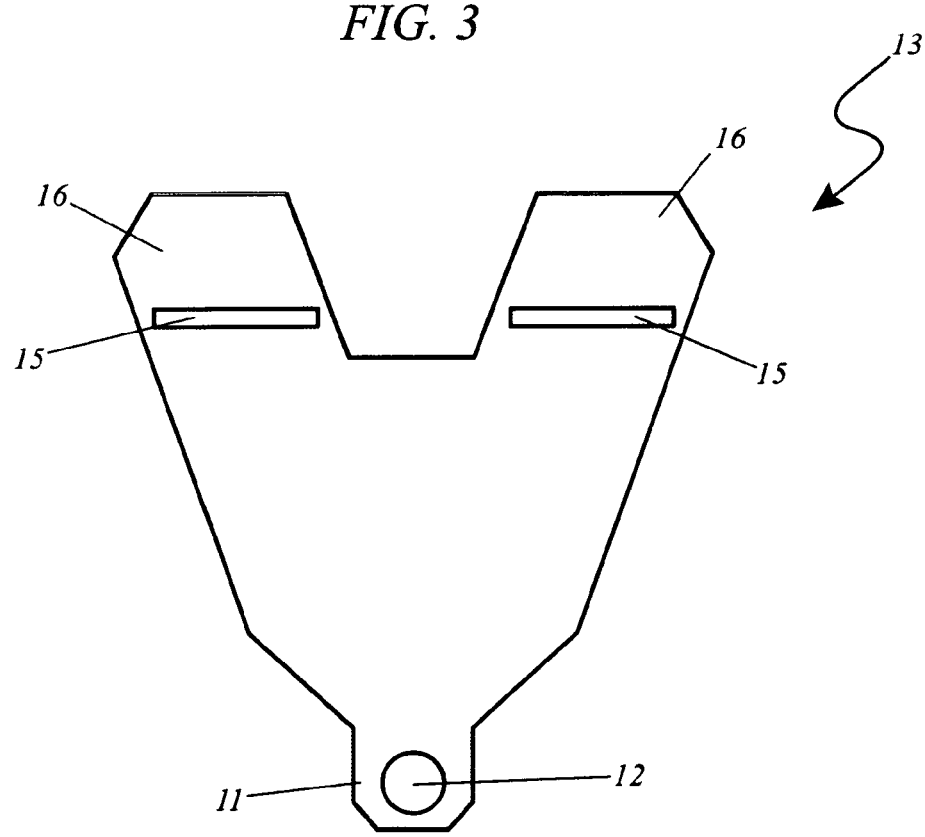
FIG. 4 is a bottom plan view of the lower clamp 13, according to a preferred embodiment of the present invention.
Figure 5:
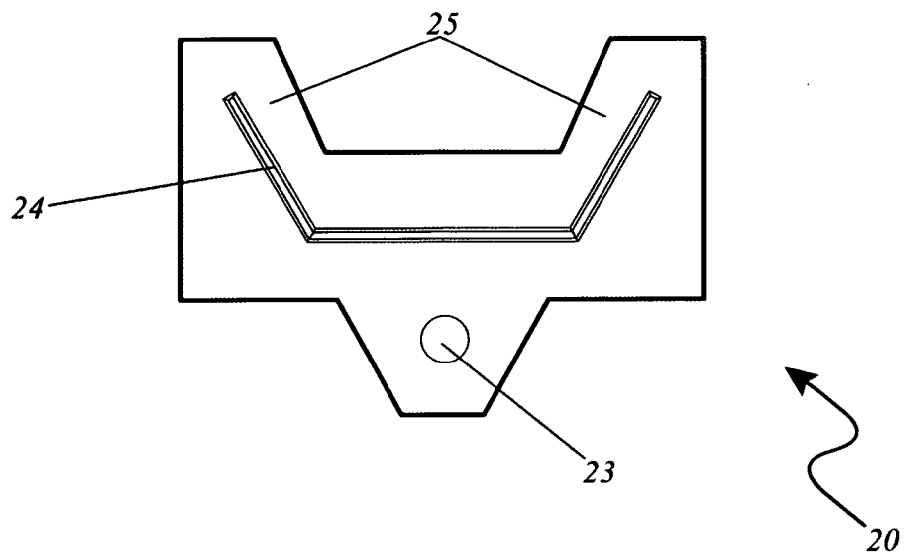
FIG. 5 is a top plan view of the upper clamp 20, according to a preferred embodiment of the present invention.

Referring now to FIGS. 3 and 4, the lower clamp 13 is essentially "Y"-shaped, with the bottom of the "Y" being defined as an extension end 11 and the upper portion of the "Y" being defined as the bifurcated end 16. The extension end 11 extends outward approximately one (1) to two (2) inches from the body of the lower clamp 13 and has a centrally located aperture defining a grommet 12 which is used to receive a carabiner or other hook-like device. In the center of the lower clamp 13 is an upstanding screw 21 that is removably inserted within a hole (not shown) and a corresponding threadably engaging nut 22. Alternate embodiments of the present invention may provide for different fasteners. Immediately above the screw 21 and nut 22 fastening assembly is a shallow groove 14 on the upper surface of the clamp 13 and shaped to follow the contour and extending into the bifurcated end 16. Two (2) identical retaining slots 15 are located within both halves of the bifurcated end 16 and extend to almost the width of each bifurcated half 16. The lower clamp 13 has a gently sloping side wall 17 providing an increasing thickness ranging from the bifurcated end 16 to the grommet end 12.

Figure 6:
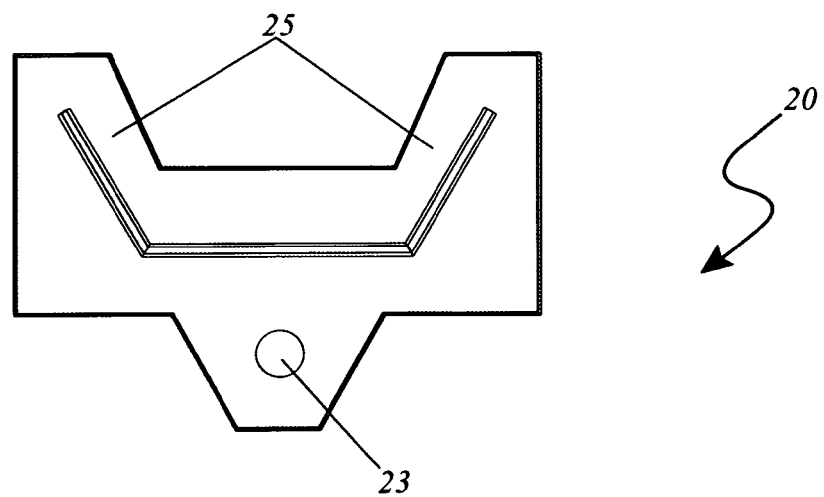
FIG. 6 is a bottom plan view of the upper clamp 20, according to a preferred embodiment of the present invention.
Figure 7:
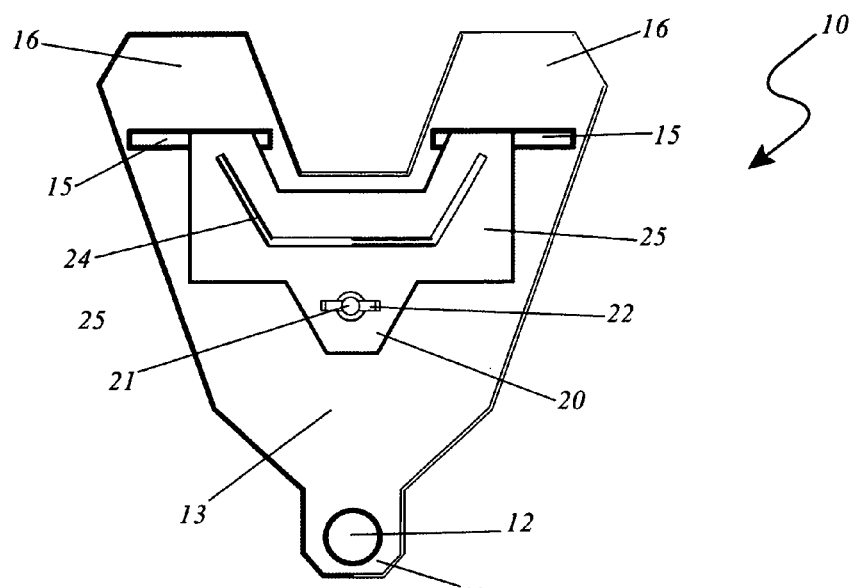
FIG. 7 is a top plan view of the secure clamping system 10, showing the upper clamp 20 mated with the lower clamp 13, according to a preferred embodiment of the present invention; and, FIG. 8 is a side elevation view of the secure clamping system 10, according to a preferred embodiment of the present invention.

Referring now to FIGS. 6 and 7, the upper clamp 20 is generally "U"-shaped with an extended tab at the bottom. The bottom tab has a bolt hole 23 formed in the center to receive the screw 21 of the bottom clamp 13 and is sized accordingly. The upper clamp 20 has two (2) opposing retaining legs 25 extending outward from the body of the clamp 20 and tapers down to enable the retaining legs 25 of the upper clamp 20 to fit within the retaining slots 15 of the lower clamp 13. A ridge 24 projecting outward from the bottom surface of the upper clamp 13 is sized and shaped to perfectly fit within the corresponding groove 14 on the lower clamp 13.

Figure 8:
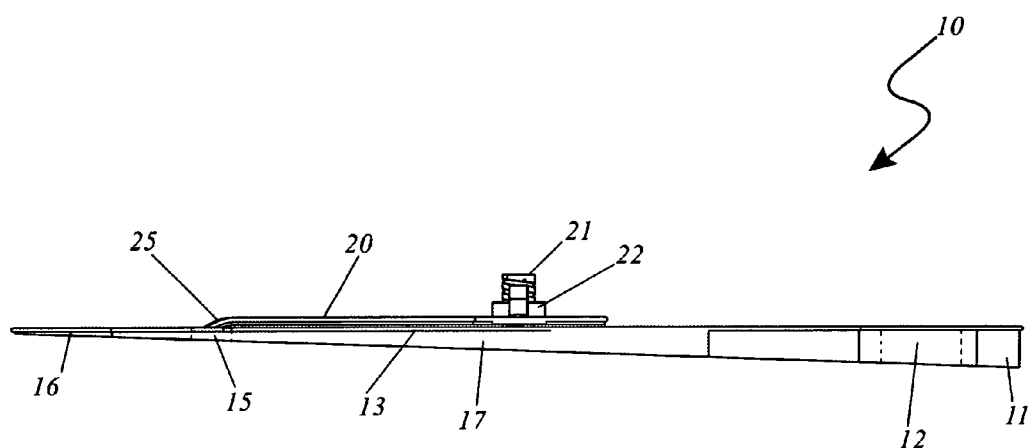

Referring now to FIGS. 7 and 8, the secure clamping system 10 is shown in mated arrangement as it is envisioned to clamp and retain a tarpaulin corner 30. FIG. 8 clearly illustrates the increasing thickness of the side wall 17 of the lower clamp 13 from the bifurcated end 16 towards the grommet 12 end. The thicker grommet end 12 of the lower clamp 13 provides additional strength and resiliency when securing the secure clamping system 10 as it is clamped to a tarpaulin 30 with a stake or hook, as well as creates as thin a profile as is structurally sound so as to prevent clearance problems.

The preferred embodiment of the present invention is designed to be used by a normal person with no special skills or training necessary.

The present system and method for securing a tarpaulin 30 to a support structure is quick easy and effective. The generally triangular shape of the securing clamp system 10 allows for the stress endured during heavy winds and outside forces to be spread evenly throughout the entire clamp 10, thereby providing additional support for the tarpaulin, 30 as it is supported. The individual procuring the existing invention 10 will most likely be reinforcing a damaged or torn tarpaulin 30; the proper use of the secure clamping system 10 can support the tarpaulin 30 and replace, move, or create a grommet location to a more secure or accessible location on the tarpaulin 30.

To use, any location on the tarpaulin 30 that is designated to be supported is to be placed overtop the lower clamp 13, ensuring that the bifurcated ends 16 of the lower clamp 13 extend fully underneath the body of the tarpaulin 30 and the extended end 11 with the grommet 12 exposed. The legs 25 of the upper clamp 20 are then forced through the retaining slots 15 of the bifurcated ends 16 of the lower clamp 13 along with a portion of the tarpaulin 30. The ridge 24 of the upper clamp 20 should match up with the groove 14 of the lower clamp 13 to add stability and also aid in retaining the tarpaulin 30. Finally, with the legs 25 of the upper section 20 forced through the slots 15 of the bifurcated end 16 of the lower section 13 along with a portion of the tarpaulin 30, the bolt hole 23 in the upper section 20 can then be placed onto the screw 21 and held in place with the nut 22 or other fastening method. The clamps 10 may be used individually or in conjunction with other clamps 10 for the tarpaulin 30 as needed.

The foregoing descriptions of specific embodiments of the present invention have been presented for purposes of illustration and description. They are not intended to be exhaustive or to limit the invention and method of use to the precise forms disclosed. Obviously many modifications and variations are possible in light of the above teaching. The embodiment was chosen and described in order to best explain the principles of the invention and its practical application, and to thereby enable others skilled in the art to best utilize the invention and various embodiments with various modifications as are suited to the particular use contemplated. It is understood that various omissions or substitutions of equivalents are contemplated as circumstance may suggest or render expedient, but is intended to cover the application or implementation without departing from the spirit or scope of the claims of the present invention.

What is claimed is:

1. A clamping assembly for securely anchoring a tarpaulin to a support surface, said clamping assembly comprising:
   a lower clamp having a first aperture formed therein and including a non-linear groove formed within a top surface thereof;
   an upper clamp including a non-linear ridge projecting downwardly from a bottom surface thereof, said ridge being interfitted and mated with said groove when said upper and lower clamps are engaged, said upper clamp being provided with an extended tab monolithically formed with a proximal end thereof, said tab being provided with a hole formed therein, said hole being aligned with said first aperture when said upper and lower clamps are engaged; and,
   a first fastener removably inserted through said first aperture and said hole respectively;
   wherein a selected portion of a tarpaulin is intercalated between said ridge and said groove in such a manner that said first fastener pushes through the selected portion of said tarpaulin.

2. The clamping assembly of claim 1, wherein said lower clamp further comprises:
   a plurality of retaining slots formed therein and oriented perpendicular to a longitudinal length of said lower clamp, each of said retaining slots having a rectilinear shape spaced distally from said groove.

3. The clamping assembly of claim 2, wherein said upper clamp further comprises:
   a plurality of opposed retaining legs extending outwardly from a centrally registered longitudinal axis of said upper clamp, each of said retaining legs tapering laterally and distally in such a manner that said retaining legs fit within said retaining slots when said upper clamp is positioned on top of said lower clamp, the selected portion of the tarpaulin being simultaneously lodged within said retaining slots while said retaining legs are fitted therein.

4. The clamping assembly of claim 1, wherein said lower clamp has a "Y"-shape defining an extended end provided with a second aperture.

5. The clamping assembly of claim 4, further comprising:
   a second fastener removably inserted through said second aperture.

6. A clamping assembly for securely anchoring a tarpaulin to a support surface, said clamping assembly comprising:
   a lower clamp having a first aperture formed therein and including a non-linear groove formed within a top surface thereof, wherein said lower clamp includes a bifurcated distal end and said groove has a general "U"-shape extending into said bifurcated distal end;
   an upper clamp including a non-linear ridge projecting downwardly from a bottom surface thereof, said ridge being interfitted and mated with said groove when said upper and lower clamps are engaged, said upper clamp being provided with an extended tab monolithically formed with a proximal end thereof, said tab being provided with a hole formed therein, said hole being aligned with said first aperture when said upper and lower clamps are engaged; and,
   a first fastener removably inserted through said first aperture and said hole respectively;

wherein a selected portion of a tarpaulin is intercalated between said ridge and said groove in such a manner that said first fastener pushes through the selected portion of said tarpaulin.

7. The clamping assembly of claim 6, wherein said lower clamp further comprises:

a plurality of retaining slots formed therein and oriented perpendicular to a longitudinal length of said lower clamp, each of said retaining slots having a rectilinear shape spaced distally from said groove.

8. The clamping assembly of claim 7, wherein said upper clamp further comprises:

a plurality of opposed retaining legs extending outwardly from a centrally registered longitudinal axis of said upper clamp, each of said retaining legs tapering laterally and distally in such a manner that said retaining legs fit within said retaining slots when said upper clamp is positioned on top of said lower clamp, the selected portion of the tarpaulin being simultaneously lodged within said retaining slots while said retaining legs are fitted therein.

9. The clamping assembly of claim 6, wherein said lower clamp has a "Y"-shape defining an extended end provided with a second aperture.

10. The clamping assembly of claim 9, further comprising:

a second fastener removably inserted through said second aperture.

* * * * *